United States Patent [19]

Woodroffe et al.

[11] 4,039,411
[45] Aug. 2, 1977

[54] ISOTOPE SEPARATION USING VIBRATIONALLY EXCITED MOLECULES

[75] Inventors: Jaime A. Woodroffe; James C. Keck, both of Andover, Mass.

[73] Assignee: Jersey Nuclear-Avco Isotopes, Inc., Bellevue, Wash.

[21] Appl. No.: 591,706

[22] Filed: June 30, 1975

[51] Int. Cl.$^2$ ............................ B01J 1/10; B01K 1/00
[52] U.S. Cl. ..................... 204/157.1 R; 204/DIG. 11; 250/527
[58] Field of Search .................. 204/157.1 R, DIG. 11

[56] References Cited

FOREIGN PATENT DOCUMENTS 1,284,620   8/1972   United Kingdom ........ 204/DIG. 11

OTHER PUBLICATIONS

Applied Optics, vol. 11, No. 2 (Feb. 1972) pp. 356-358.

*Primary Examiner*—Howard S. Williams

*Attorney, Agent, or Firm*—Weingarten, Maxham & Schurgin

[57] ABSTRACT

A system for isotope separation or enrichment wherein molecules of a selected isotope type in a flow of molecules of plural isotope types are vibrationally excited and collided with a background gas to provide enhanced diffusivity for the molecules of the selected isotope type permitting their separate collection. The system typically is for the enrichment of uranium using a uranium hexafluoride gas in combination with a noble gas such as argon. The uranium hexafluoride molecules having a specific isotope of uranium are vibrationally excited by laser radiation. The vibrational energy is converted to a translation energy upon collision with a particle of the background gas and the added translation energy enhances the diffusivity of the selected hexafluoride molecules facilitating its condensation on collection surfaces provided for that purpose. This process is periodically interrupted and the cryogenic flow halted to permit evaporation of the collected molecules to provide a distinct, enriched flow.

62 Claims, 6 Drawing Figures

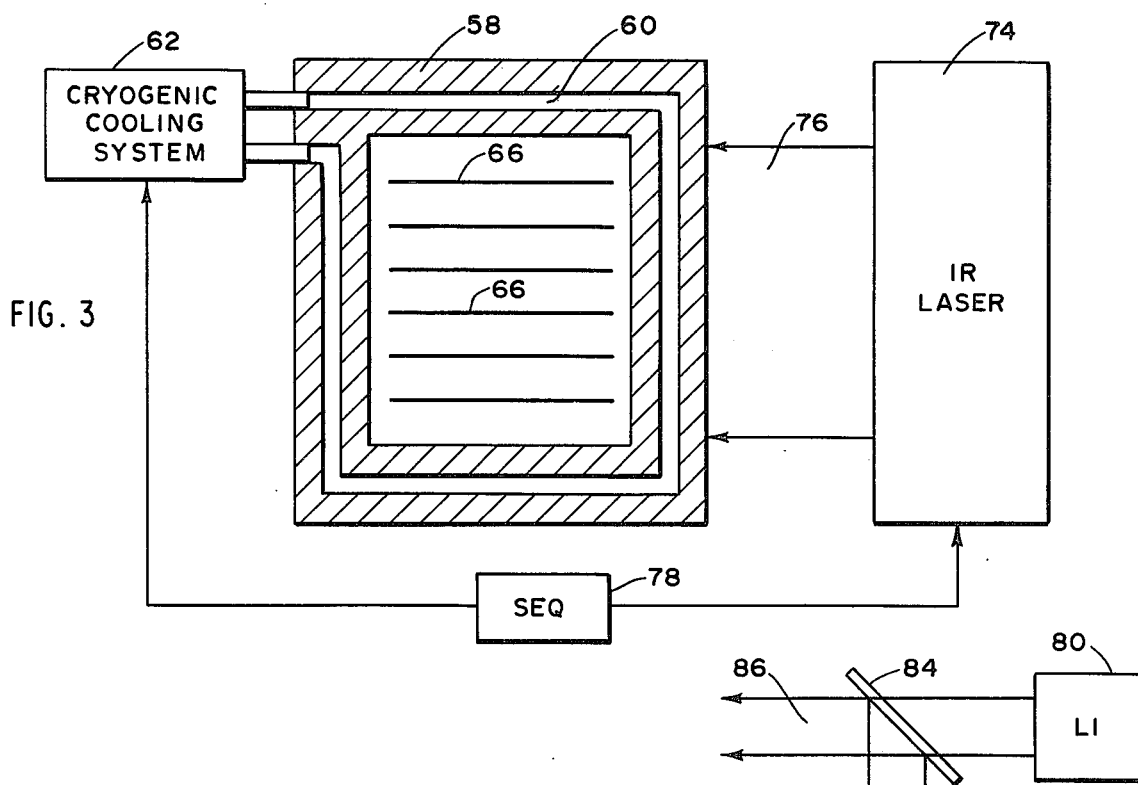
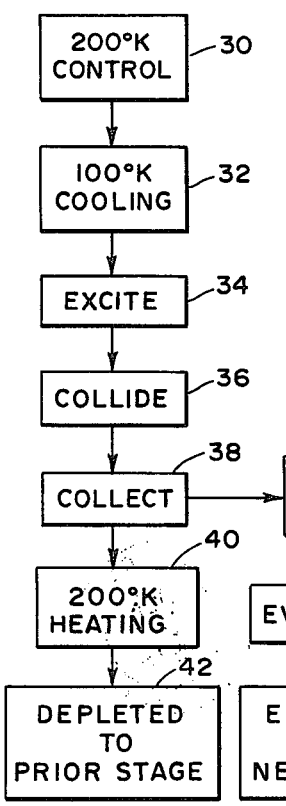
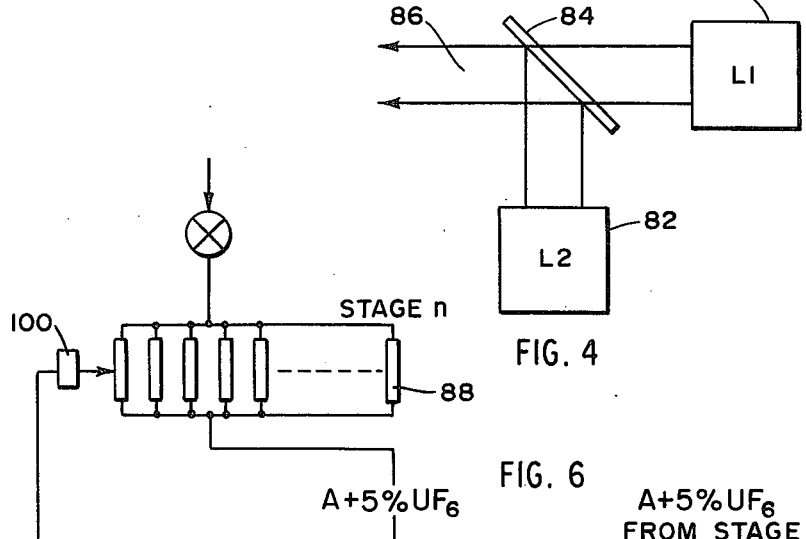
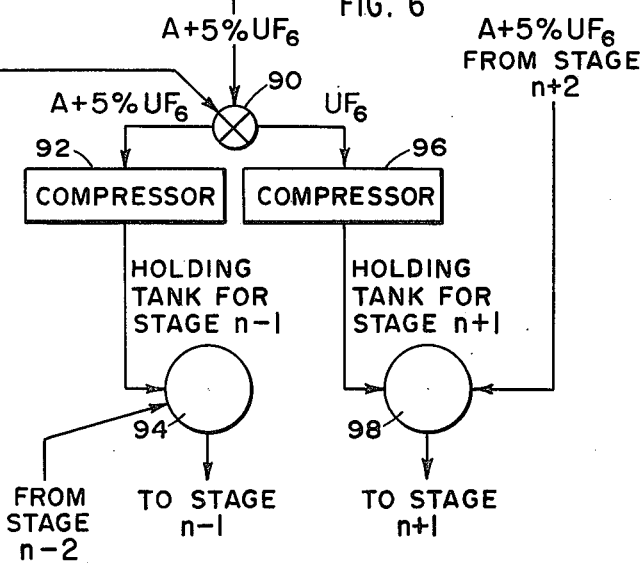

ISOTOPE SEPARATION USING VIBRATIONALLY EXCITED MOLECULES

FIELD OF THE INVENTION

This invention relates to isotope separation and in particular to isotope separation employing isotopically selective vibrational excitation and vibration-translation reactions of the excited particles.

BACKGROUND OF THE INVENTION

The laser has been recognized as having utility in isotope separation by creating an excitation of one particular isotope without corresponding excitation of a different isotope of the same material. The excitation may be either of electrons in the various orbital states about the atom as, for example, illustrated in U.S. Pat. No. 3,772,519, assigned to the same assignee as the present application, or may be vibrational excitation as shown in United States patent application Ser. No. 514,303, filed Oct. 15, 1974, and also assigned to the same assignee as the present application. Isotopically selective excitation of electron orbital states is typically employed in a process of isotopically selective ionization with the result that the desired isotope type particles are given an electrical charge distinct from the particles of other isotope types that permits their physical separation through interaction with electrical, magnetic or combined fields. In the case of vibrational excitation, it has been proposed to modify the accommodation coefficient through vibrational excitation of a selected isotope type molecule such that in the process of diffusion of molecules of a mixture of isotopes through narrow diffusion chambers, the vibrationally excited isotope will accommodate or stick less readily to the channel walls and thereby diffuse at a higher rate, substantially increasing diffusion efficiency.

BRIEF SUMMARY OF THE PRESENT INVENTION

In accordance with the teaching of the present invention, vibrational excitation of molecules having components of a selected isotope type is used to produce a conversion from vibration to translational excitation of the selected isotope type molecules by collision with the molecules of a heavy carrier or background gas. The resulting difference in translation between the molecules of the selected isotope type and all other molecules of the same components but different isotope permits their separate collection.

In the preferred embodiment of the present invention specifically adapted for uranium enrichment, a subsonic cryogenic flow of molecules of uranium hexafluoride in combination with the carrier or background gas of a noble element such as argon is directed through a cooled chamber that is illuminated by laser radiation tuned to vibrationally excite the uranium hexafluoride molecules of a specific uranium isotope type to an excited vibrational state. The density of the background or carrier gas is preferably maintained substantially higher than the density of the uranium hexafluoride to provide a higher probability of collision of the vibrationally excited molecules with a background molecule than with an unexcited $UF_6$ molecule. In this case the vibrationally excited uranium hexafluoride will typically collide with a molecule of the background gas causing a conversion of the excitation energy into a translation of the excited molecule which results in a higher thermal energy or diffusivity than that of the other uranium hexafluoride molecules.

The flowing molecules including the excited molecules directly enter a set of channels defined by collecting surfaces which are cryogenically cooled. The higher thermal velocity or diffusivity of the excited molecules increases the probability of their striking a collection surface with respect to the probability for other molecules generally. The molecules which strike the collector surfaces immediately condense due to the cryogenic temperatures of the surfaces. After a predetermined thickness of molecules is collected on the surfaces, the flow of uranium hexafluoride is interrupted and the chamber heated to the point of vaporization of the collected hexafluoride permitting its removal as a distinct, enriched stream of uranium hexafluoride.

A typical enrichment facility will include several stages of enrichment of the type described above to produce a cumulative enrichment and depletion of the desired isotope type in distinct flow paths. It is particularly useful in such a multistage system to employ the subsonic flow of the present invention as it avoids a multiplicity of recompression steps of free expansions and also avoids the problems associated with boundary layers in supersonic flows through narrow passages and at low densities.

BRIEF DESCRIPTION OF THE DRAWING

These and other features of the present invention are more fully set forth below in the detailed description of the preferred embodiment and the accompanying drawing of which:

FIG. 3 is an orthogonal sectional view of the apparatus of FIG. 2;

FIG. 4 is a view of a system of lasers for use in the present invention;

FIG. 5 is a flow chart of the enrichment process according to the present invention; and FIG. 6 is a diagram of an arrangement for linking several stages according to the present invention.

DETAILED DESCRIPTION OF THE PREFERRED EMBODIMENT

The present invention contemplates a system for the enrichment of isotopes occurring in molecular compounds by vibrationally exciting molecules containing an atom or atoms of a particular isotope without correspondingly exciting other molecules and colliding the excited molecules with the particles of a background gas to convert the vibration into a translation of the molecule. The translation directs it toward a collection surface provided to receive those molecules of the particular isotope type in enriched or concentrated proportions.

The invention makes use of a subsonic flow of gas through a conduit which has been found to be an efficient mechanism for generating the flowing environment of the molecules to be enriched in a mixture with a background or carrier gas. The channel subsonic flow avoids the boundary layer and flow interface problems associated with supersonic flows through narrow passages at low densities and the uneconomical requirement for recompression in a free expansion system.

The enrichment scheme is typically contemplated to include a number of stages operating on the principle of the above-described concept wherein each stage provides separate enriched and depleted output flows that are in turn applied to the flow inputs of distinct other stages for the further separation of those outputs into additionally enriched and depleted streams in each case.

Figure 1:
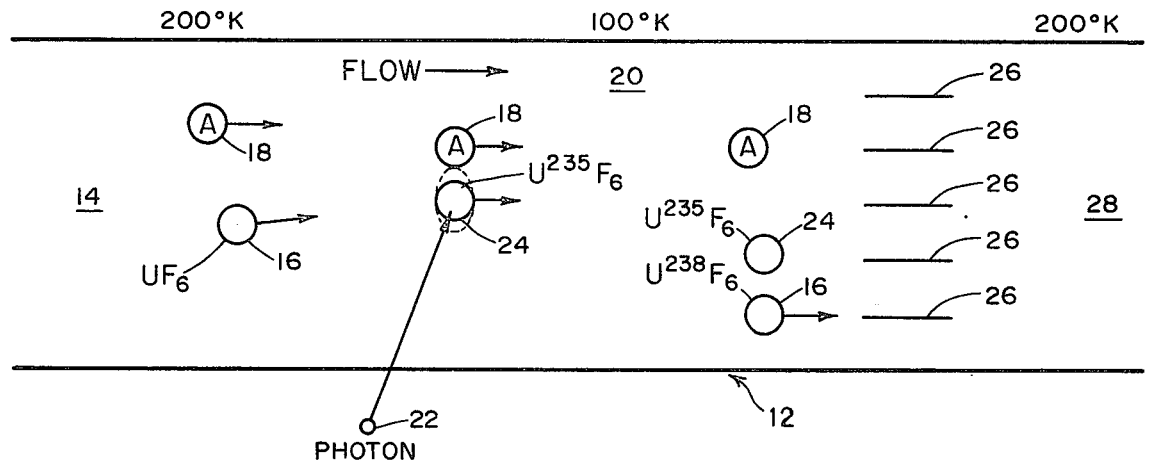
FIG. 1 is a diagram illustrating the principal of operation of the present invention in a single enrichment stage.

The present invention is particularly provided for the separation of uranium in isotopes occurring in the molecular form as uranium hexafluoride. The principle of operation of the present invention for the separation of hexafluoride molecules based on uranium isotope types is illustrated in the diagram of FIG. 1. As shown there, a conduit 12 has an inlet portion 14 into which a subsonic flow of a mixture of uranium hexafluoride molecules 16 and atoms 18 of a noble gas, preferably argon, is directed. The inlet portion 14 is temperature controlled to approximately 200° K. The gas flowing in the conduit 12 at this temperature is above the condensation point so that it will not tend to adhere to the walls of the conduit 12.

Farther down the conduit in a region 20, a further temperature controller lowers the thermal energy of the gases in the conduit to approximately 50°-100° K which is well below the condensation temperature for the uranium hexafluoride molecules. This low temperature insures a high percentage of the molecules will be in the ground vibrational state and that the width of the rotational Q branch is narrower than the shift or separation between the $^{235}UF_6$ and $^{238}UF_6$ isotopes. In this region 20, the gas flowing through the conduit 12 is illuminated with laser radiation in the infrared spectral region of approximately 12 or 16 microns and precisely tuned to a vibrational absorption line for one of the uranium isotopes in the hexafluoride molecule, typically the U-235 isotope. Photons 22 of that particular energy are absorbed with a given probability by one of the molecules 24 which contain in particular the U-235 isotope. The laser excitation in the photon 22 employed to produce a vibrational excitation of the molecules in the present invention is to be distinguished from laser induced excitation of electron energies in atoms or molecules as, for example, represented in the above-referenced U.S. Pat. No. 3,772,519. In the latter, laser excitation, particularly of a substantially higher frequency and photon energy, is employed to produce a transition in the energy state of, for example, a uranium atom, by forcing outer orbital electrons to step to a more remote electron orbit, and ultimately to an ionized state through radiation absorption or other mechanisms. In the present invention, laser radiation is employed to produce vibration of molecular atoms from energy imparted by photon absorption at the molecule. The laser radiation absorbed by the molecule induces a vibrational excitation of the atoms of the molecule which can be viewed as inducing a strictly mechanical oscillation of the molecule. For this result, the laser is preferably selected for its capability of being tuned to a specific frequency which will vibrationally excite the molecule. Additionally, as described below, the laser is adjusted so that its output wavelength is suitably limited to provide isotopic selectivity in the molecules that are vibrationally excited. In this case, the isotopic selectivity produces vibrational excitation of the uranium hexafluoride molecules containing the U-235 isotopes without corresponding excitation of molecules containing the other, predominantly U-238, isotopes.

The vibrationally excited molecules 24 of uranium hexafluoride will, as a result of random motions superimposed upon the flow through the conduit 12, collide with other molecules or atoms in the flowing gas. This collision of the vibrationally excited molecule is preferably with one of the argon atoms 18. This collision is employed to convert the vibrational energy of the excited uranium hexafluoride molecule into a translation of the uranium hexafluoride molecule that contributes a velocity and direction of motion to that particle distinct from that to the general flow through the conduit 12. Typically, the direction of motion contributed will be randomly distributed about a sphere with equal probabilities for all directions. The net flow direction will thus include a component that causes the now translationally excited uranium hexafluoride particle 24 to move or diffuse towards the edges of the conduit 12. This component of motion permits the separate collection of concentrated or enriched proportions of the excited uranium hexafluoride molecules on collection surfaces 26. The surfaces 26 are aligned parallel to the general flow direction through the conduit 12 so as to collect a minimum of the unexcited particles while insuring that a substantial quantity of the excited particles will strike the collecting surfaces 26 where they will condense due to the low temperature, below the condensation temperature of the molecules, maintained within the region 20.

Those particles in the flow which pass through the surfaces 26 without condensation on them continue through the conduit 12 to a region 28 which reheats the flow of particles to approximately 200° K to inhibit further condensation on the walls of the conduit.

The flow through the conduit 12 is typically at the rate of 60 meters per second but is not necessarily limited to that velocity so long as a subsonic flow is achieved. While argon is a convenient carrier or background gas, it is conceivable to employ other gases such as helium, krypton, xenon, nitrogen or neon. It is additionally desired to have a substantially higher density of the argon or background gas than the density in molecules per unit volume of the uranium hexafluoride to be enriched. This insures a substantially higher probability that the vibrationally excited uranium hexafluoride molecules will collide with one of the argon molecules than with another uranium hexafluoride molecule which may or may not be of the desired isotope type. Since the collision will impart a translation to both the vibrationally excited molecule and the molecule with which it is collided, it is desired to avoid collisions of an excited uranium hexafluoride molecule with a second uranium hexafluoride molecule that in general would produce a nonselective translational excitation or thermal energization of the second uranium hexafluoride molecule. Such undesired translational excitation would reduce the enrichment of the desired isotope in the molecules of uranium hexafluoride on the collection surfaces 26. It is of little concern whether quantities of the carrier gas molecules collect with the enriched uranium hexafluoride since they may be readily separated later by known techniques. Accordingly, a typical density for the uranium hexafluoride molecules is set approximately an order of magnitude below the density of the carrier gas molecules. In the example shown, the $UF_6$ density is 5%. In the case of argon, the density of argon molecules is based upon the following considerations; insuring vibrational cooling or de-excitation of the uranium hexafluoride in the cold channel to the point where the absorption line widths for the hexafluoride molecules is sufficiently narrow to permit isotopically selective absorption; the desire to inhibit dimerization or higher order conglomeration of the molecular gas particles; the desire to have sufficient quantities of argon atoms available to insure a significant probability for collision between vibrationally excited uranium hexafluoride molecules and the argon molecules of the background gas; and the desire to have the laser beam propagate for distances of use in an isotope separation facility, typically tens of meters. From these considerations, the density of argon has been selected as $3 \times 10^{14}$ per cubic centimeter.

The considerations which determine the temperature in the conduit 12 in the respective regions 14, 20 and 28 are that sufficient thermal energy be present in the gas flowing through the regions 14 and 28 to prevent the condensation of the gas upon the walls of the conduit while the temperature for the region 20 must be sufficiently cold to separate the absorption bands for $U^{235}F_6$ and $U^{238}F_6$, this is well below the condensation temperature for uranium hexafluoride, thereby insuring a sufficient cooling of the surfaces 26 so that a high percentage of the translationally or thermally excited particles which preferentially strike the collection surfaces 26 will adhere. The temperatures and parameters specified above are indicated as typical but not limiting values based upon the considerations just described.

After the process of collecting enriched particles of uranium hexafluoride illustrated with respect to FIG. 1 has resulted in the collection of a predetermined thickness of enriched condensate on the surfaces 26, the flow through the conduit 12 is terminated and the region of the surfaces 26 heated to evaporate the collected uranium hexafluoride. The evaporated uranium hexafluoride is then collected out of the conduit 12 by itself or in a flow of pure argon where it may be conducted to a further similar conduit for additional enrichment based upon the same principles of operation.

This process is more particularly illustrated in FIG. 5 showing a flow chart of the steps of enrichment for each stage, such as that illustrated in FIG. 1. As shown in FIG. 5, the entering argon and uranium hexafluoride mixture passes through a conduit region where it is controlled in temperature to 200° K in a temperature control step 30. The flow is subsequently cooled in a step 32 to 100° K in the region of excitation and separation. The cooled argon and uranium hexafluoride mixture is then vibrationally excited in a step 34 by the application of laser radiation directly ahead of the region of collecting surfaces 26. The vibrationally excited molecules collide as represented by a step 36, preferentially with atoms of the background or carrier gas, transferring the vibrational excitation into a translational excitation that adds a component of motion to the flow of uranium hexafluoride molecules in the conduit 12 which in turn directs them or diffuses them more rapidly for condensation on one of the surfaces 26 in a collecting step 38. Because heat diffuses out of the argon and uranium hexafluoride mixture faster than the molecules diffuse to the conduit walls, it is possible to insure that condensation takes place primarily on the collection surfaces 26.

The remaining components in the gas flow not collected in step 38 are reheated in the region 28 to 200° K in a step 40 to prevent further condensation and the heated flow, forming a depleted output stream, may be applied to the next previous stage of enrichment in a step 42 for further processing. Periodically, the flow of uranium hexafluoride through the conduit 12 is ceased in a step 44 and the condensate on the surfaces 26 and chamber walls evaporated in a step 46 resulting in the generation of enriched gas which in a step 48 may be applied to the next succeeding stage of enrichment for yet further enrichment of the desired uranium isotope in the hexafluoride molecule. The enriched evaporant may be pumped out of the conduit to the next stage or be carried out by passing pure argon through.

Figure 2:
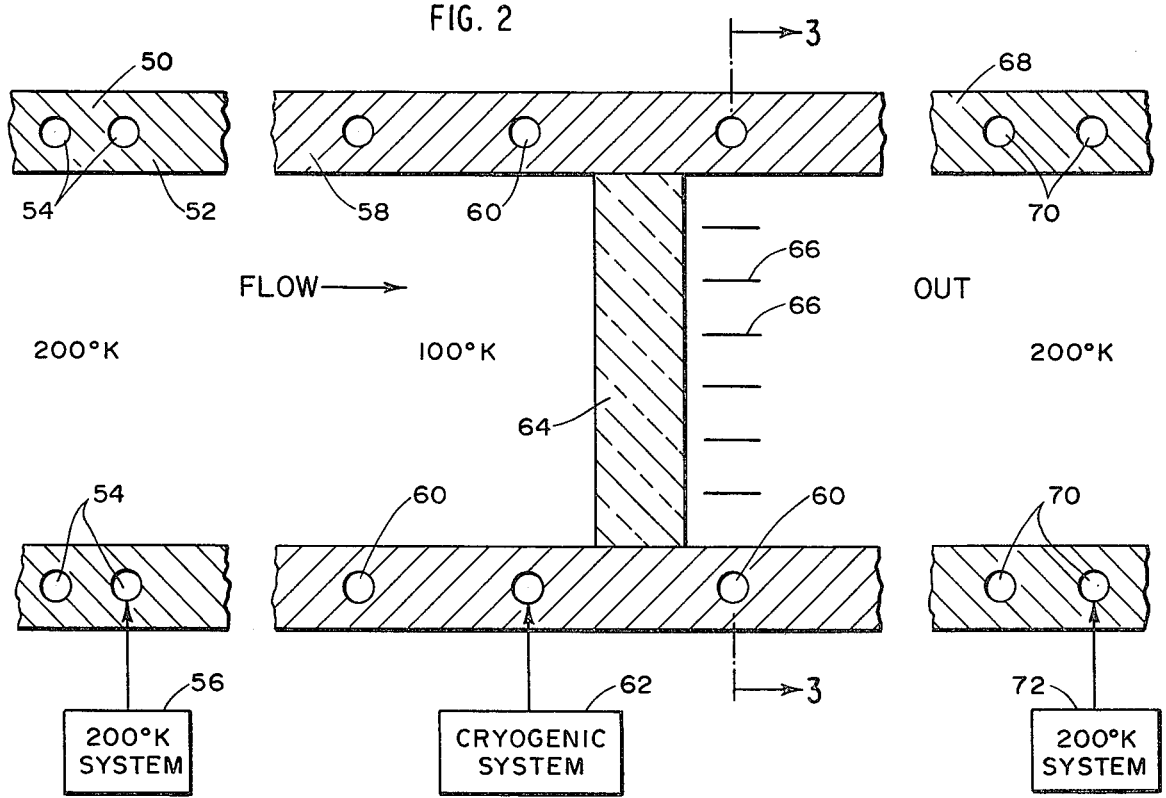
FIG. 2 is a sectional view of a preferred embodiment for an enrichment system according to the present invention.

Specific apparatus comprising a single stage of enrichment according to the present invention is illustrated in FIGS. 2-3. As shown in FIG. 2, a conduit 50 is approximately 10 centimeters high by 20 meters deep in interior dimension and has an outer wall 52 through which a set of cooling channels 54 communicate with a temperature control system 56 which maintains the temperature of the region within the conduit 50 at 200° K as specified above. The conduit 50 leads to a similarly dimensioned conduit 58 having further cooling channels 60 through which a refrigerant is pumped from a cryogenic cooling system 62 to maintain the region within the conduit 58 at 100° K. For the dimensions of conduit 58 specified above, a typical length for the conduit 58 to insure that the flow of argon and uranium hexafluoride in the specified densities are cooled to 100° K is approximately 200 centimeters. At a point in the region of the conduit 58 where the temperature of 100° K has been reached, a window 64 is set in one side wall of the conduit 58 to permit illumination of the flow with laser radiation tuned to produce vibrational excitation of the uranium hexafluoride molecule having the desired isotope type. The dimension of the applied laser beam in the direction of gas flow is approximately one centimeter. Directly downstream of the window 64 are a set of collection surfaces 66 which extend to define a series of channels parallel to the general flow through the conduit 58. The separation of the surfaces 66 is approximately 20 millimeters and their length approximately 200 millimeters which are typical dimensions based upon the distribution of flow velocity for the translationally excited particles.

The conduit 58 leads to a further conduit 68 of similar dimension in which a series of fluid channels 70 carry a heating fluid from a temperature controller 72 that maintains a temperature of 200° K within the conduit 68, thereby heating the gas flow in that region.

FIG. 3 illustrates an orthogonal sectional view of the conduit 58 in the region indicated in FIG. 2, and illustrating the channels 64 for a cryogenic refrigerant, as well as the sets of surfaces 66 defining the channels through the conduit 58.

FIG. 3 further shows an infrared laser 74 which may be a carbon disulfide laser having an output beam 76 turned to a vibrational absorption line near 12 microns in wavelength. Beam 76 is applied through the window 64 to the region directly upstream of the collection surfaces 66. The laser 74 is typically, but not necessarily, a continuous laser with an output of approximately 1,000 watts (40 watts per sq. centimeter). A sequencer 78 is also shown which is employed to control the excitation radiation from laser 74 and the flow of coolant through the channels 60 from the cryogenic cooling system 62 to provide periodic cessation of laser radiation coupled with heating of the region of the conduit 58 to the typical temperature of 200° K to evaporate the condensate from the surfaces 66.

While a single frequency of excitation laser radiation has been shown, it may be preferable to use a plurality of laser radiation sources such as by employing first and second lasers 80 and 82 shown in FIG. 4. The output beams of the lasers 80 and 82 may be combined by a beam combiner 84 to provide a composite beam 86 which is applied through the window 64. This permits the use of several frequencies of laser excitation to vibrationally excite the desired isotope in the uranium hexafluoride molecule from not only the ground or zero vibrational energy level, but from one or more levels above the ground vibrational energy level. Such not only increases the yield of enriched condensate by exciting vibrationally particles which are in elevated energy states and thus not available for excitation with a single frequency, but in removing the molecules from the next few higher levels of vibrational excitation, reduces the bottleneck effect created by their presence. The vibrational relaxation from these low-lying states is slow compared to the time for relaxation from highly excited states.

A multistage enrichment facility is further provided wherein each stage includes several (typically 150) conduit systems of the type illustrated above in FIGS. 2 and 3, all arranged in parallel. The enriched and depleted product of each stage is applied respectively to similar higher and lower order enrichment stages for further processing. The gas phase input to each stage is thus a composite of the enriched output of the next lower order stage and the depleted output of the next higher order stage.

Such a system is illustrated in FIG. 6. As shown there, a plurality of enrichment conduits 88 of the type described above receive in parallel a gaseous argon and uranium hexafluoride mixture. The combined flow output is applied to a valve 90 which is controlled to direct the flow through a compressor 92 to a holding tank 94 for the next lower order stage or through a compressor 96 to a holding tank 98 for the next higher order stage of enrichment. The compressors 92 and 96 compensate for gas pressure loss caused by friction in each of the conduits 88. The valve 90 is operated through a control 100 in synchronism with the sequencer 78 to provide the depleted output from the conduits 88 through compressor 92 to storage tank 94 and, during the evaporation of the condensate from the surfaces 66, the enriched output through the compressor 96 to holding tank 98. The holding tank 94 will additionally receive the enriched output from the second lower order enrichment stage and the tank 98 will also receive the depleted output from the second higher order enrichment stage.

The above-described implementation is intended as an exemplary embodiment of the present invention, the scope of which is defined in the following claims.

What is claimed is:

1. A method for separating molecules by the isotope type of a component therein, said components occurring in a plurality of isotope types, the method comprising the steps of:
    establishing a flow of said molecules with a carrier medium having particles of a distinct chemical type;
    selectively photoexciting into an elevated vibrational state molecules having components of a first isotope type;
    colliding the vibrationally excited molecules with the particles of said carrier medium to enhance the diffusivity of said excited molecules as a result of collision; and
    segregating the molecules with enhanced diffusivity from the flow of said molecules with said carrier medium.

2. The method of claim 1 further including the step of separately repeating the steps of claim 1 a plurality of times on the segregated molecules and remaining molecules.

3. The method of claim 1 further including the step of controlling said flow of molecules to inhibit dimerization and higher order combinations thereof.

4. The method of claim 1 wherein the flow of molecules and carrier medium is subsonic.

5. The method of claim 1 wherein said carrier medium is at a density substantially higher than the density of said molecules having components in plural isotope types.

6. The method of claim 5 wherein the density of said medium is greater by approximately an order of magnitude than the density of said molecules having components in plural isotope types.

7. The method of claim 1 wherein said carrier medium includes argon gas.

8. The method of claim 7 wherein said molecules include uranium hexafluoride.

9. The method of claim 8 further including the step of cryogenic cooling of the flow of said molecules and carrier medium prior to said exciting step.

10. The method of claim 9 wherein said cryogenic cooling step includes the step of cooling to approximately 50°– 100° K.

11. The method of claim 9 further including the step of heating the cooled flow of said molecules and carrier medium to a temperature above the condensation temperature thereof subsequent to said segregating step.

12. The method of claim 7 wherein the temperature specified in claim 11 is approximately 200° K.

13. The method of claim 11 further including the step of maintaining said flow of molecules and carrier gas at a temperature above the condensation temperature thereof prior to said cooling step.

14. The method of claim 13 wherein the temperature specified in claim 8 is approximately 200° K.

15. The method of claim 6 wherein:
    said segregating step further includes the step of collecting the molecules having said enhanced diffusivity on a surface; and
    a step is provided of periodically evaporating the collected molecules from said surface and simultaneously inhibiting the flow of said molecules.

16. The method of claim 15 further including the step of carrying the evaporated molecules with a carrier gas.

17. The method of claim 9 wherein said step of vibrationally exciting molecules having components of one isotope type includes the step of applying laser radiation to the flow of molecules and carrier medium.

18. The method of claim 17 wherein said laser radiation is limited in frequency to the frequency of one or more vibrational energy transitions for the molecules having the components of the one isotope type without corresponding in frequency to a vibrational energy transition for the molecules having components of other isotope types.

19. The method of claim 1 wherein said step of vibrationally exciting includes applying laser radiation to the flow of molecules and carrier medium.

20. The method of claim 19 wherein said laser radiation is within the infrared spectral region.

21. The method of claim 19 wherein said laser radiation includes one or more frequencies limited to vibrationally excite molecules having components of said one isotope type without correspondingly exciting molecules having components of other isotope types.

22. The method of claim 21 wherein said laser radiation contains frequencies for excitation of vibrational transitions from the ground state and one or more elevated vibrational energy states to reduce bottlenecking by populations of the one or more elevated states.

23. The method of claim 1 wherein said colliding step includes the step of establishing a greater density for said carrier medium than for said flow of molecules to provide a greater probability for collision by an excited molecule with particles of said carrier medium than with unexcited molecules containing components of other isotope types.

24. The method of claim 23 wherein said carrier medium includes a noble gas.

25. The method of claim 24 wherein said noble gas includes argon and said molecules include uranium hexafluoride with the density of said argon gas being approximately $3 \times 10^{14}$ per cubic centimeter and the density of the uranium hexafluoride being approximately an order of magnitude less.

26. The method of claim 1 wherein said segregating step includes the step of collecting the molecules having the enhanced diffusivity on a surface.

27. The method of claim 26 further including the steps of:
periodically interrupting the flow of said molecules with said carrier medium; and
evaporating the collected molecules from said surface during the period of interrupted flow.

28. The method of claim 1 further including the step of cooling the flow of said molecules to a temperature substantially below the condensation temperature of said molecules prior to said exciting step.

29. The method of claim 28 wherein said flow is cooled to approximately 50°–100° K.

30. The method of claim 28 further including the step of heating the cooled flow to a temperature above the condensation temperature of said molecules after said segregating step.

31. The method of claim 30 further including the step of maintaining the temperature of said flow above the condensation temperature of said molecules prior to said cooling step.

32. The method of claim 31 wherein the temperature specified in claims 28 and 29 is approximately 200° K.

33. A method for separating molecules based upon the isotope type of a component of the molecule, said method comprising the steps of:
establishing a flow of said molecules through a conduit, the molecules having components occurring in plural isotope types, in combination with a flow of a carrier gas at a substantially higher density than the density of said molecules;
cooling the flow of molecules and carrier gas to a temperature below the condensation temperature of said molecules at which a high percentage of said molecules are in the ground vibrational state;
applying one or more frequencies of narrow band infrared radiation to selectively vibrationally excite one or more vibrational transitions in the molecules having components of one isotope type without correspondingly exciting molecules having components of other isotope types;
colliding the vibrationally excited molecules with the particles of said carrier gas to convert the vibrational excitation of said molecules into a translation component imparting an enhanced diffusivity to the excited molecules after collision as compared to the unexcited molecules;
collecting the molecules having the enhanced diffusivity on surfaces in increased concentrations; and
periodically interrupting the flow of said molecules and evaporating the collected molecules from said surfaces to provide a separation thereof.

34. The method of claim 33 wherein said molecules include a compound of uranium.

35. The method of claim 33 further including the step of:
applying the flow of molecules subsequent to said collecting step to a first further conduit and repeating the steps of claim 32 on the flow in said first further conduit; and
applying the evaporated molecules to a second further conduit and repeating the steps of claim 32 on the evaporated molecules in said second further conduit.

36. The method of claim 35 wherein said applying steps include the steps of compressing the flow and evaporant respectively and holding the compressed flow and evaporant in respective tanks for application to the first and second further conduits.

37. A system for separating molecules by the isotope type of a component therein, said component occurring in a plurality of isotope types, the system comprising:
a conduit;
means for establishing in said conduit a flow of said molecules;
means for selectively photoexciting into an elevated vibrational state molecules having components of a first isotope type;
said flow including a carrier medium having particles colliding with the vibrationally excited molecules and enhancing the diffusivity of said excited molecules as a result of collision; and
means for segregating molecules with ehanced diffusivity from the flow of said molecules with said carrier medium.

38. The system of claim 37 further including means for cooling the flow of said molecules to a temperature substantially below the condensation temperature of said molecules.

39. The system of claim 37 wherein said flow establishing means includes means for providing a subsonic flow of molecules and carrier medium.

40. The system of claim 37 wherein said molecules include uranium hexafluoride and further including means for cryogenic cooling of the unexcited flow of said molecules and carrier medium.

41. The system of claim 40 wherein said cryogenic cooling means includes means for cooling to approximately 50°–100° K.

42. The system of claim 40 further including means for heating the cooled flow of said molecules and carrier medium to a temperature above the condensation temperature thereof.

43. The system of claim 42 further including means for maintaining the uncooled flow of molecules and carrier gas at a temperature above the condensation temperature thereof.

44. The system of claim 40 wherein said segregating means includes:
a surface placed to collect the molecules having said enhanced diffusivity; and
means for periodically evaporating the collected molecules from said surface.

45. The system of claim 40 wherein said means for vibrationally exciting molecules having components of one isotope type includes means for applying laser radiation to the flow of molecules and carrier medium.

46. The system of claim 45 wherein said means for applying laser radiation includes means for limiting the frequency thereof to correspond to the frequency of one or more vibrational energy transitions for the molecules having the components of the one isotope type without corresponding to a vibrational energy transition for the molecules having components of other isotope types.

47. The system of claim 37 wherein means for vibrationally exciting includes means for applying laser radiation to the molecular flow and carrier medium.

48. The system of claim 47 wherein said laser radiation is infrared.

49. The system of claim 47 wherein said laser radiation applying means includes means for applying one or more frequencies limited to vibrationally excite molecules having components of said one isotope type without correspondingly exciting molecules having components of other isotope types.

50. The system of claim 49 wherein said laser radiation applying means includes means for applying plural frequencies for excitation of vibrational transitions from the ground state and one or more elevated vibrational energy states to reduce bottlenecking by populations of the one or more elevated states.

51. The system of claim 37 including a greater density for said carrier medium than for said flow of molecules to provide a greater probability for collision by an excited molecule with particles of said carrier medium than with unexcited molecules containing components of other isotope types.

52. The system of claim 51 wherein the density of said medium is greater by approximately an order of magnitude than the density of said molecules having components in plural isotope types.

53. The system of claim 51 wherein said carrier medium includes a noble gas.

54. The system of claim 53 wherein said noble gas includes argon and said molecules include uranium hexafluoride with the density of said argon gas being approximately $3 \times 10^{14}$ per cubic centimeter and the density of the uranium hexafluoride approximately an order of magnitude less.

55. The system of claim 37 wherein said segregating means includes a surface collecting thereon the molecules having the enhanced diffusivity.

56. The system of claim 55 further including:
means for periodically interrupting the flow of said molecules; and
means for evaporating the collected molecules during the period of interrupted flow.

57. A system for separating molecules based upon the isotope type of a component of the molecule, said system comprising:
a conduit;
means for establishing a flow of said molecules through said conduit, the molecules having components occurring in plural isotope types, in combination with a flow of a carrier gas at a substantially higher density than the density of said molecules;
means for cooling the flow of molecules and carrier gas to a temperature below the condensation temperature of said molecules at which a high percentage of said molecules are in the ground vibrational state;
means for applying one or more frequencies of narrow band infrared radiation to selectively vibrationally excite one or more vibrational transitions in the molecules having components of one isotope type without correspondingly exciting molecules having components of other isotope types;
the carrier gas including particles which collide with the vibrationally excited molecules to convert the vibrational excitation of said molecules into a translation component imparting an enhanced diffusivity to the excited molecules after collision with respect to the unexcited molecules;
a plurality of surfaces collecting the molecules having the enhanced diffusivity in increased concentrations;
means for periodically interrupting the flow of said molecules; and
means for evaporating the collected molecules from said surfaces to provide a separation thereof.

58. The system of claim 57 wherein said molecules include a compound of uranium.

59. The system of claim 57 further including:
means for applying the uncollected flow of molecules to a first further conduit; and
means for applying the evaporated molecules to a second further conduit.

60. The system of claim 59 wherein said applying means both include:
means for compressing the flow and evaporant respectively; and
tanks for holding the compressed flow and evaporant respectively.

61. The system of claim 59 wherein said conduit and said first and second further conduits each include a plurality of parallel passages.

62. A method for separating molecules by the isotope type of component therein, said component occurring in a plurality of isotope types, the method comprising the steps of:
directing a mixture of molecules containing the isotope to be separated in combination with a carrier gas at a temperature substantially above the condensation temperature of said molecules toward a set of collection surfaces;
cooling said molecules to a temperature sufficiently low to separate vibrational absorption bands of the molecules having different isotopes in said component;
applying photoexcitation radiant energy to said molecules, said energy adapted for selective absorption by said molecules having an isotope of a predetermined type to vibrationally excite said molecules;
the vibrationally excited molecules colliding with the particles of said carrier gas to convert the vibrational excitation to an enhanced diffusivity;
the molecules of enhanced diffusivity being directed past said collection surfaces where they condense in concentrations greater than their concentration in the directed mixture.

* * * * *